Oct. 16, 1951      F. J. ARNOLD      2,571,516
CANDY PACKAGE AND METHOD OF PRESERVING CANDY
Filed March 18, 1950
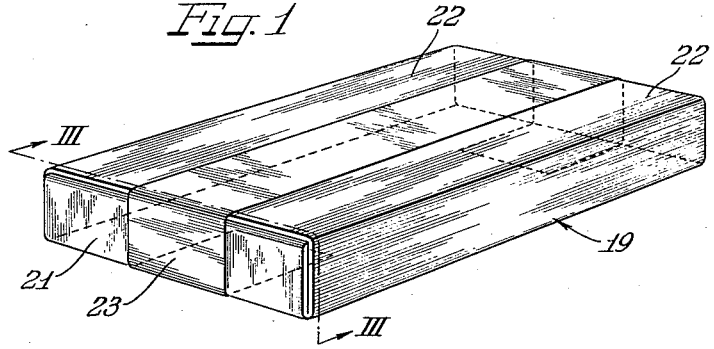
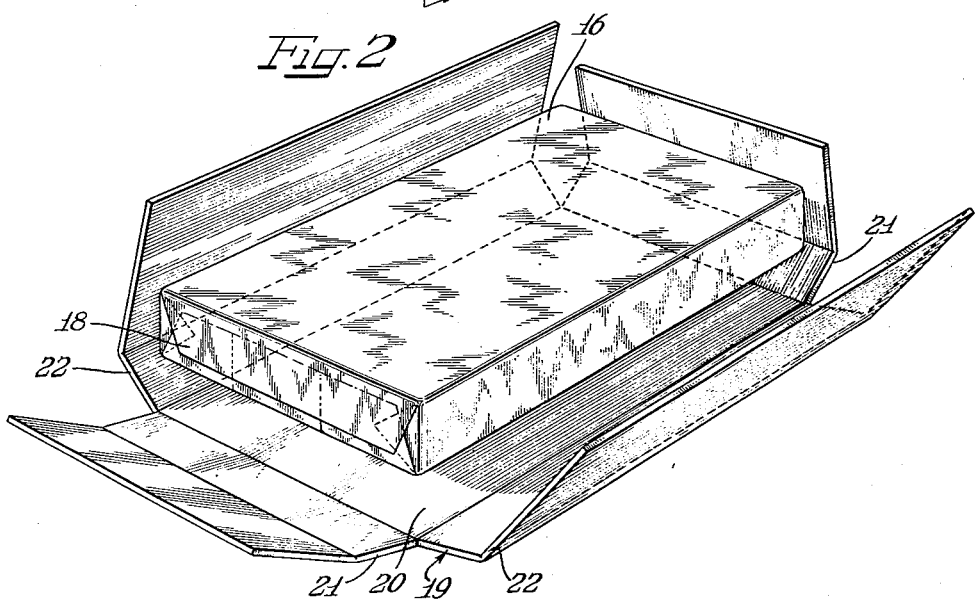
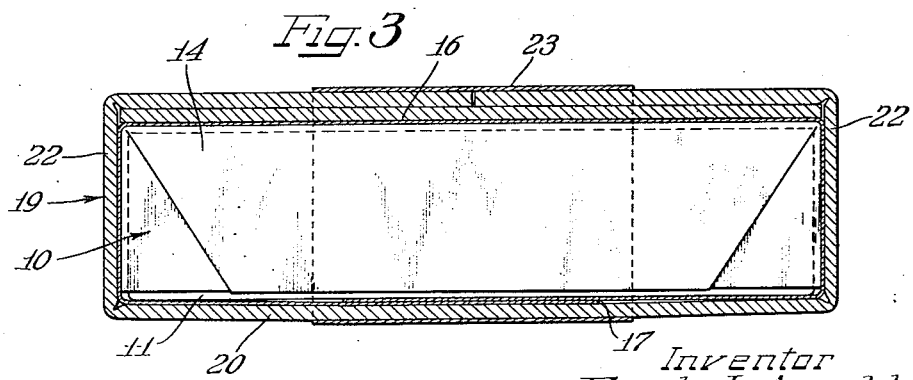
Inventor
Fred J. Arnold
by      Attys Patented Oct. 16, 1951

2,571,516

UNITED STATES PATENT OFFICE 2,571,516

CANDY PACKAGE AND METHOD OF PRESERVING CANDY

Fred J. Arnold, Chicago, Ill., assignor to Illinois Fannie May Candy Company, Chicago, Ill., a corporation of Illinois Application March 18, 1950, Serial No. 150,453

9 Claims. (Cl. 99—180)

The present invention relates to improvements in candy packages and methods of preserving candy, and more particularly, relates to a new and improved method and package particularly adapted to preserve and store chocolate candy and to retain the original freshness and color of the candy for indefinite periods of time.

While chocolate candies containing inverted sugars or yeast enzymes have relatively long shelf life at normal room temperatures, these ingredients change and break down the texture of the cream, and for this reason, are frequently not used in chocolate creams sold from the shelf in retail manufacturing confectionery stores, and particularly chocolate creams of the fresh, hand-rolled, homemade type.

It is also well known that chocolate-coated candies are extremely sensitive to temperature changes. Chocolate, when subjected to a low temperature, and then brought into a higher temperature, will turn gray unless specially protected. For this reason, previous attempts to store packaged chocolates in a frozen state have never been successful.

In previous attempts to store packaged chocolate candy, it has been found that when the frozen chocolate is taken out of a deep-freeze unit, it frequently turns gray and a dapple gray due to sweating of the chocolate caused by condensation of moisture.

It has further been found that careful control of the freezing and thawing temperatures will reduce mottling and discoloring of the candy. Such control, however, cannot be attained where the candy is to be sold directly from a deep-freeze unit, and the relatively rapid thawing of the candy offsets the controlled freezing, making it impractical to deep-freeze and store packaged chocolate candy and sell it from a deep-freeze unit.

It has further been found that many of the difficulties in deep-freezing packaged chocolate candy are due to the condensation of moisture on the candy caused by relatively rapid thawing of the candy, and that where this can be prevented, the spoiling is reduced. It has still further been found that the sealing of the packaged candy from moisture and the retarding of the freezing to at least a day and the retarding of the temperature rise of the packaged candy after taking it from a deep-freeze unit makes it possible to successfully freeze and store fresh packaged candy for indefinite periods of time without spoiling or changing in color and to sell the chocolate candy directly from a deep-freeze unit.

A principal object of my invention is to provide a method of preserving chocolate candy by deep-freezing, by protecting the candy against moisture and sudden temperature changes.

A further object of my invention is to provide a method of preserving chocolate candy for long periods of time by providing a vapor barrier around the candy to prevent the access of moisture to the candy, insulating the candy against sudden changes in temperature, and freezing the candy at below zero temperatures.

A still further object of my invention is to provide a new and improved process for storing chocolate candy by protecting the candy from moisture, retarding temperature changes in the candy by insulation, and freezing and storing the moisture protected and insulated candy at temperatures below zero.

Still another object of my invention is to provide a method of packaging candy for freezing which consists in placing the candy in a container, wrapping the container in a moisture-impervious seal, and insulating the sealed container against sudden temperature changes.

Another and principal object of my invention is to provide a novel and simplified form of a protective package for containing chocolate candy for storing by deep freezing.

These and other objects of my invention will appear from time to time as the following specification proceeds and with reference to the accompanying drawing wherein:

Figure 1 is a perspective view of a form of candy package constructed in accordance with my invention;

Figure 2 is an exploded view of the package shown in Figure 1; and

Figure 3 is a sectional view taken substantially along line III—III of Figure 1.

Referring now in particular to the drawing, I have shown in Figure 1 a package for candy consisting of a box 10, which may be packed with candy in a well known manner. The box 10 may be of a well known form made from cardboard and may have a bottom portion 11 with the usual side and end walls closed by a cover portion 14 having a top and side and end walls corresponding to the walls of the bottom portion and extending along the outer sides thereof.

The box 10 is sealed from vapor or moisture by means of a wrapper 16 which should be a relatively heavy gauge transparent cellophane of a type which is impervious to moisture. The wrapper 16 is wrapped around and completely covers the box and overlaps along the bottom of the box as indicated by reference character 17. The opposite ends of the wrapper are turned upwardly and downwardly along the ends of the box in overlapped relation with respect to each other as indicated by reference character 18. Said overlapping ends are then sealed with a moisture-proof seal as by the application of a sealing iron thereto in a manner well known to those skilled in the art. The moisture-proof wrapper 16 thus forms a vapor barrier around the box 10 and retains freshness and moisture in the candy, preventing it from drying out and also preventing moisture from getting into the box 10 and condensing on the chocolate during the freezing and thawing operations. While the box 10 is herein described as being wrapped in a heavy transparent cellophane wrapper, it need not be wrapped in cellophane but may be wrapped in other moisture-proof wrappings as well, such as polyethylene, vinylite, polyvinylalcohol, rubber hydrochloride, polyvinylidene, moisture-proof aluminum foil wrapping, or any other similar wrapping which may be sealed to form a vapor barrier around the candy-containing box and the candy therein.

The box 10 sealed by the wrapper 16, forming a vapor barrier therearound, is further insulated against sudden temperature changes by means of an insulating container, herein shown as being a packing box 19 made from corrugated cardboard, although it may be made from other insulating materials. The box 19 has a bottom 20, projecting end portions 21—21 bent to extend upwardly along opposite ends of the wrapped box 10 and inwardly along the cover of said box 10, and projecting side portion 22—22 bent to extend along opposite sides of the wrapped box and along the tops of the cover portions of the end portions 21—21 into abutting engagement with each other. The abutting ends of the side portions 22—22 may then be sealed by gummed tape 23 in a well known manner. The corners and ends of the container may also be sealed by gummed tape, although they need not be so sealed, the overlapping cover portions of the side walls providing sufficient insulation to retard the freezing of the chocolate when placed in a deep-freeze unit at below zero temperatures for at least a day and retard the thawing to such a uniform rate as to prevent spoilage or changes in color of the chocolate.

In preserving the candy, it may first be packaged in the box 10 in a usual manner. The box 10 may then be covered and wrapped in the moisture-proof wrapping or vapor barrier 16 and the overlapping ends thereof may be sealed, preferably by heat as is well known to those skilled in the art, to completely seal the box and provide a substantially air-tight and moisture-proof wrapping for the box 10 packed with chocolate candy. The box 10, sealed against moisture, may then be packaged in the corrugated container 19 to provide the necessary insulation to retard freezing and thawing of the chocolate to the required uniform rate, which may be closed by gummed tape. The corrugated container 19 being sealed, the entire package may then be placed in a deep-freeze unit and frozen and maintained at temperatures below zero for long periods of time. The package may then be removed from the deep-freeze unit at any time desired to thaw at room temperatures, the insulating container 19 retarding the thawing of the chocolate to the extent necessary to prevent mottling thereof or change of color.

The moisture-proof wrapping 16 thus forms a vapor barrier around the packed box 10 and prevents the candy from drying out and keeps moisture from getting into the box 10 and from condensing on the chocolate both during freezing and thawing and, together with the insulating container 19, retards freezing at below zero temperatures for at least a day and also retards the temperature rise of the chocolate to the uniform rate necessary during thawing and seals the candy against moisture, preventing sweating and discoloring thereof.

A chocolate candy packaged and preserved in accordance with my invention may thus be sold directly from a deep-freeze unit with no added preservatives, and when such candy is so sold, it is sold in the corrugated container which serves a definite purpose in the preserving process and should not be removed until sufficient time has elapsed for the chocolate to thaw.

It will be understood that modifications and variations may be effected without departing from the scope of the novel concepts of the present invention.

I claim as my invention:

1. A method of preserving chocolate candy comprising the steps of providing a vapor barrier around the candy, insulating the vapor barrier and freezing and storing the insulated and moisture-protected candy at deep-freezing temperature.

2. A method of preserving chocolate candy comprising the steps of protecting the candy from moisture, insulating the moisture-protected candy and freezing and storing the insulated and moisture-protected candy at temperatures of zero degrees Fahrenheit and below.

3. A method of preserving chocolate candy comprising the steps of placing the candy in a container, providing a vapor barrier around the container, insulating the vapor-protected container against sudden temperature changes and storing the insulated container at temperatures of zero degrees Fahrenheit and below.

4. A method of preserving chocolate candy comprising the steps of placing the candy in a container, providing a vapor barrier around the container by completely enclosing it in a moisture impervious seal, enclosing the sealed container in an insulating container and thereby portecting the candy against sudden temperature changes and then storing the insulated and moisture-protected candy at below zero temperature.

5. A protective package for storing chocolate candy for deep-freezing comprising a box-like container having chocolate candy therein and having a cover, a moisture-proof wrapping for said container and cover sealed to render said container impervious to moisture, and an insulating covering completely surrounding said wrapper and insulating said wrapped container against sudden changes in temperature.

6. A method of preserving chocolate candy comprising the steps of providing a vapor barrier around the candy, slowly reducing the temperature of the candy to a point below zero degrees Fahrenheit, maintaining the candy at a temperature below zero degrees Fahrenheit and then slowly raising the temperature of the candy to normal room temperature.

7. A method of preserving chocolate candy comprising the steps of providing a vapor barrier around the candy, slowly reducing the temperature of the candy over a period of at least a day to a temperature below zero degrees Fahrenheit, storing the candy at a temperature below zero degrees Fahrenheit and slowly raising the temperature back to normal use temperature.

8. A method of preserving chocolate candy comprising the steps of providing a vapor barrier around the candy, insulating the vapor barrier, then disposing the candy with its vapor barrier and insulation directly in a compartment maintained at below freezing temperatures, removing the candy with its vapor barrier and insulation to a region of normal use temperature and then removing said vapor barrier and said insulation after thawing.

9. The method of preserving chocolate or chocolate-coated candy comprising the steps of enclosing the candy with insulation and a vapor barrier, then freezing the candy so enclosed and storing the insulated and moisture-protected candy at sub-freezing temperature.

FRED J. ARNOLD.

REFERENCES CITED

The following references are of record in the file of this patent:

UNITED STATES PATENTS

| Number | Name | Date |
| --- | --- | --- |
| 1,657,272 | Neusbaum | Jan. 24, 1928 |
| 1,813,786 | Webster | July 7, 1931 |
| 1,852,228 | Birdseye | Apr. 5, 1932 |

OTHER REFERENCES

"Vapor-Tight Paper," Modern Packaging, November 1948, page 104.